United States Patent

Kuperman

[11] Patent Number: 5,770,242
[45] Date of Patent: Jun. 23, 1998

[54] DOUGH FORMING APPARATUS

[76] Inventor: Alex Kuperman, 141 Homewood Avenue, Willowdale, Ontario, Canada, M2M 1K4

[21] Appl. No.: 715,387
[22] Filed: Sep. 13, 1996
[51] Int. Cl.⁶ .................................................. A21C 11/00
[52] U.S. Cl. ........................ 425/364 B; 425/371; 426/499
[58] Field of Search .................................. 426/499, 512; 425/288, 364 B, 371

[56] References Cited

U.S. PATENT DOCUMENTS

| 4,147,809 | 4/1979 | Thompson | 426/499 |
| 4,368,019 | 1/1983 | Thompson | 425/141 |
| 4,478,565 | 10/1984 | Thompson | 425/141 |
| 5,395,229 | 3/1995 | Atwood | 426/499 |

OTHER PUBLICATIONS

Automated Baking Technologies Ltd., Bagel Former BM–3600, Horizontal Bagel Former.
BEMA Tech '95, Sep. 13–15, 1995, Las Vegas Convention Center, Las Vegas, Nevada.

Primary Examiner—George Yeung
Attorney, Agent, or Firm—Fitzpatrick, Cella Harper & Scinto

[57] ABSTRACT

The present invention provides a dough forming apparatus generally comprising a plurality of longitudinally aligned forming belts to receive and convey a piece of dough, the plurality of belts configured such that the plurality of belts form an annular passageway. A mandrel is provided which extends substantially coaxially within the annular passageway. The apparatus further comprises a drive device operable to provide simultaneous movement of the plurality of forming belts. The present invention also provides a process for forming a toroid of dough.

19 Claims, 6 Drawing Sheets

DOUGH FORMING APPARATUS

BACKGROUND OF THE INVENTION

1. Field of the Invention

The present invention relates to the field of bakery equipment. More specifically, the present invention relates to the field of dough forming apparatus.

2. Description of the prior Art

Dough forming machines are known in the art. U.S. Pat. No. 4,368,019 issued Jan. 11, 1983, discloses a dough receiving, shaping and forming machine for making dough bodies of predetermined size and configuration. The machine generally comprises, in a single machine frame, an infeed conveyor for receiving a batch of unshaped dough, at least two pairs of shaping rollers and a divider means to pre-shape the dough into two rectangular strips and a forming means. The forming means receives the individual dough strips and forms them into toroids or alternatively into dough balls of various sizes. The forming means comprises a large number of individual tubular cups mounted on a drive chain, each cup individually having an open position and a closed position. In use, a dough strip is placed into an open cup, the cup is then advanced toward a stationary mandrel. The cup is closed so that it forms a cylinder around the mandrel. As the closed cup advances along the length of the mandrel, the dough becomes rolled into a toroid shape. Once the toroid is formed, the cup is opened and the formed toroid is removed for further processing. Unfortunately, this type of dough divider and forming machine is prone to mechanical breakdown due to the complexity of its design.

Single belt bagel forming machines are also known. An example of such a machine is the BM-3600 Horizontal Bagel Former manufactured by ABI Auto Bake Industries Ltd., Woodbridge, Ontario, Canada. As the name implies, this type of machine comprises a single, substantially horizontal forming belt. The closed-loop conveyor-type belt is generally planar at either end, but forms a cylindrical shape towards its centre. The cylindrical shape is formed by curving the longitudinal edges of the belt upward until the opposed edges abut one another. The cylinder formed by the belt forms around a centrally located, elongate, stationary mandrel. In use, a piece of unformed dough is placed on the planar "start" end of the belt. As the belt advances and wraps into its cylindrical portion around the stationary mandrel, the dough is formed into a toroid shape. Once the dough has advanced along the complete length of the mandrel (approximately 13–18 inches) and the toroid shape is formed, the belt un-wraps. The formed toroid of dough may then be removed from the once-again planer belt. Best results are obtained if the original dough piece is generally rectangular. Unfortunately, the wrapping of the planer belt into a cylindrical shape puts a lot of stress on the belt, thereby significantly shortening its useful life.

SUMMARY OF THE INVENTION

It is an object of the present invention to provide a dough forming apparatus which obviates and mitigates at least one the disadvantages of the dough forming machines of the prior art.

Accordingly, in one aspect the present invention provides a dough forming apparatus comprising:

(i) a plurality of longitudinally aligned forming belts to receive and convey a piece of dough, the plurality of belts configured such that the plurality of belts form an annular passageway;

(iii) a mandrel, at least a portion of the mandrel extending substantially coaxially within the annular passageway; and (iv) a drive means operable to provide simultaneous movement of the plurality of forming belts.

In another aspect, the present invention provides a process for forming a toroid of dough comprising the steps of:

(i) introducing a piece of dough at a receiving end of an annular passageway;

(ii) conveying the piece of dough through the passageway by simultaneous movement of a plurality of belts, such that the piece of dough contacts a mandrel located substantially coaxially within the passageway;

(iii) rolling the dough between the mandrel and the plurality of belts such that the dough forms a toroid around the mandrel; and (iv) removing the toroid from the passageway.

Preferably, step (iii) comprises inducing a rolling motion in the dough as a portion of the dough in contact with at least one belt is conveyed through the passageway at the speed of movement of the plurality of belts and a second portion of the dough is partially retarded by contact with the mandrel, the rolling motion induced in the dough causing the dough to form a toroid around the mandrel.

Also preferably, step (iii) comprises retarding the movement of a first edge of the dough as it passes along the mandrel, then retarding a second edge of the dough such that the first end catches and merges with the second edge.

With regard to the dough forming apparatus, in a preferred embodiment of the present invention, the plurality of belts, the mandrel and the drive means are all attached to a single frame. Also preferably, each belt has an arcuate surface.

Also preferably, each of the plurality of belts extends around a tail pulley attached proximal a first end of the frame and a drive gear attached proximal a second end of the frame. The tail pulley may be provided with a means to tension the belt.

BRIEF DESCRIPTION OF THE DRAWINGS

An embodiment of the present invention will be described, by way of example only, with reference to the accompanying drawings, in which.

DETAILED DESCRIPTION OF THE PREFERRED EMBODIMENTS

Figure 1:
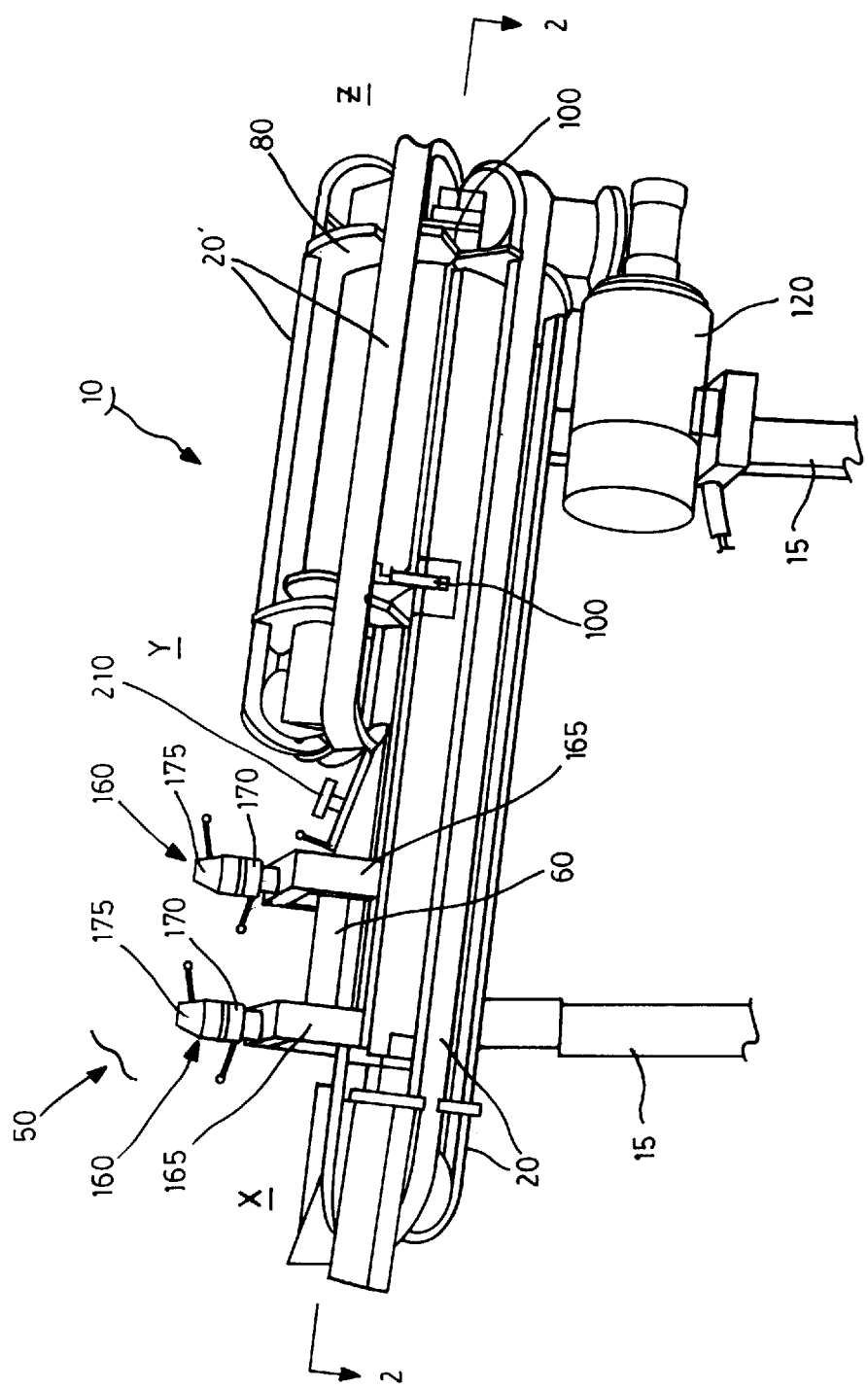
FIG. 1 is a schematic representation of a dough forming apparatus in accordance with one embodiment of the present invention.
Figure 2:
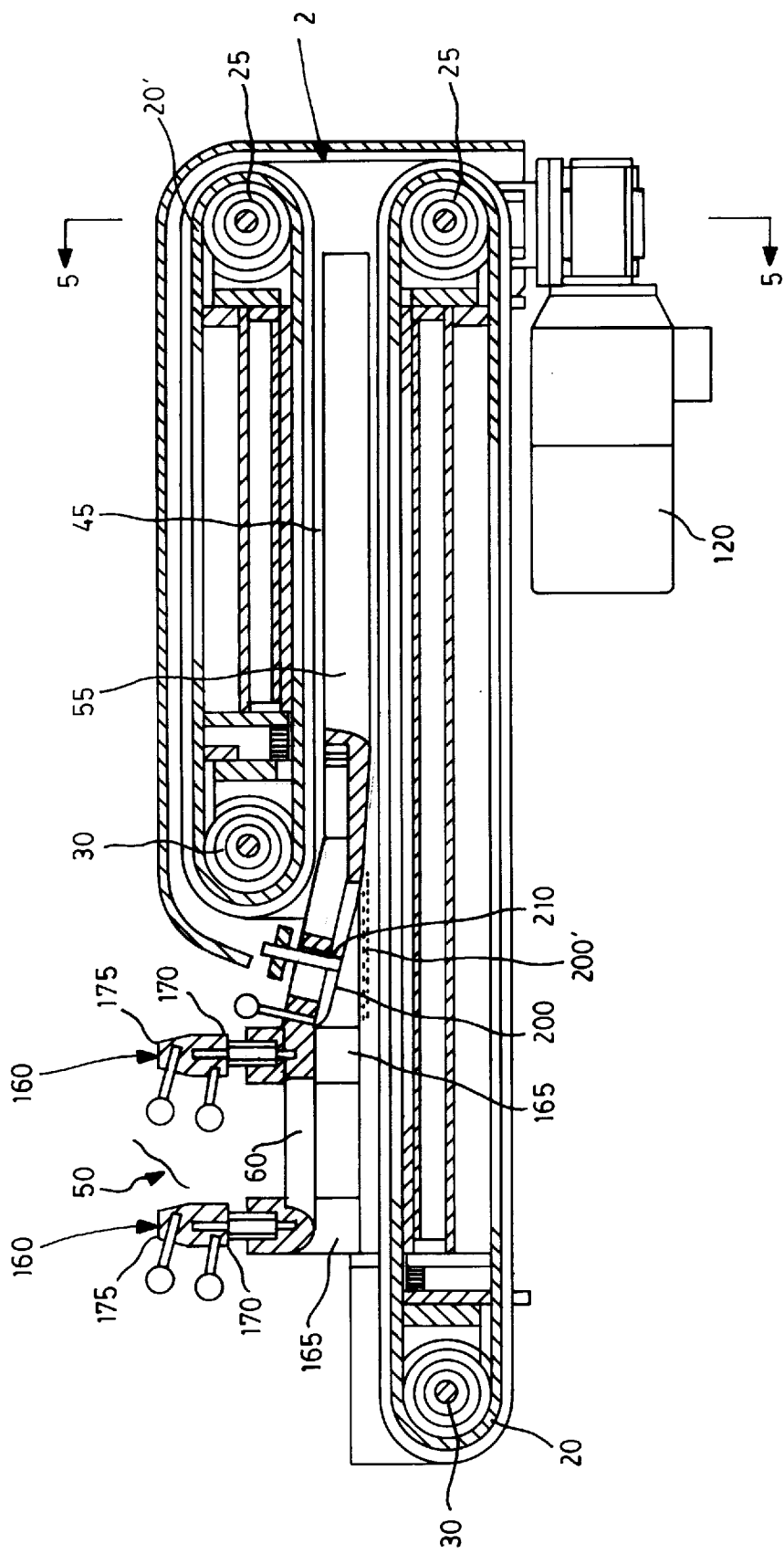
FIG. 2 is a cross-sectional view along the line 2—2 of the dough forming apparatus of FIG. 1.
Figure 3:
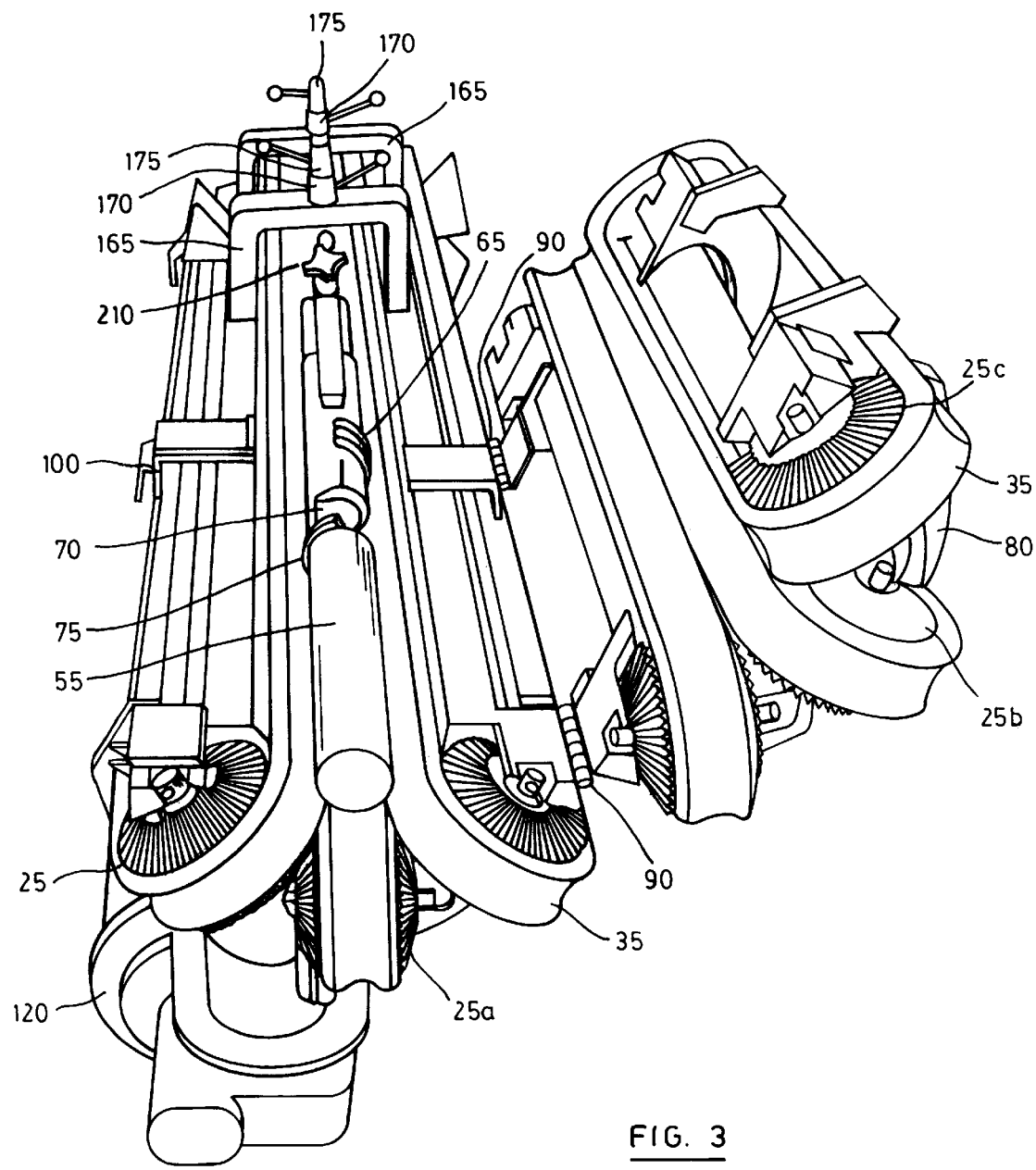
FIG. 3 is a perspective end view of the dough forming apparatus of FIG. 1 in its open position.
Figure 4:
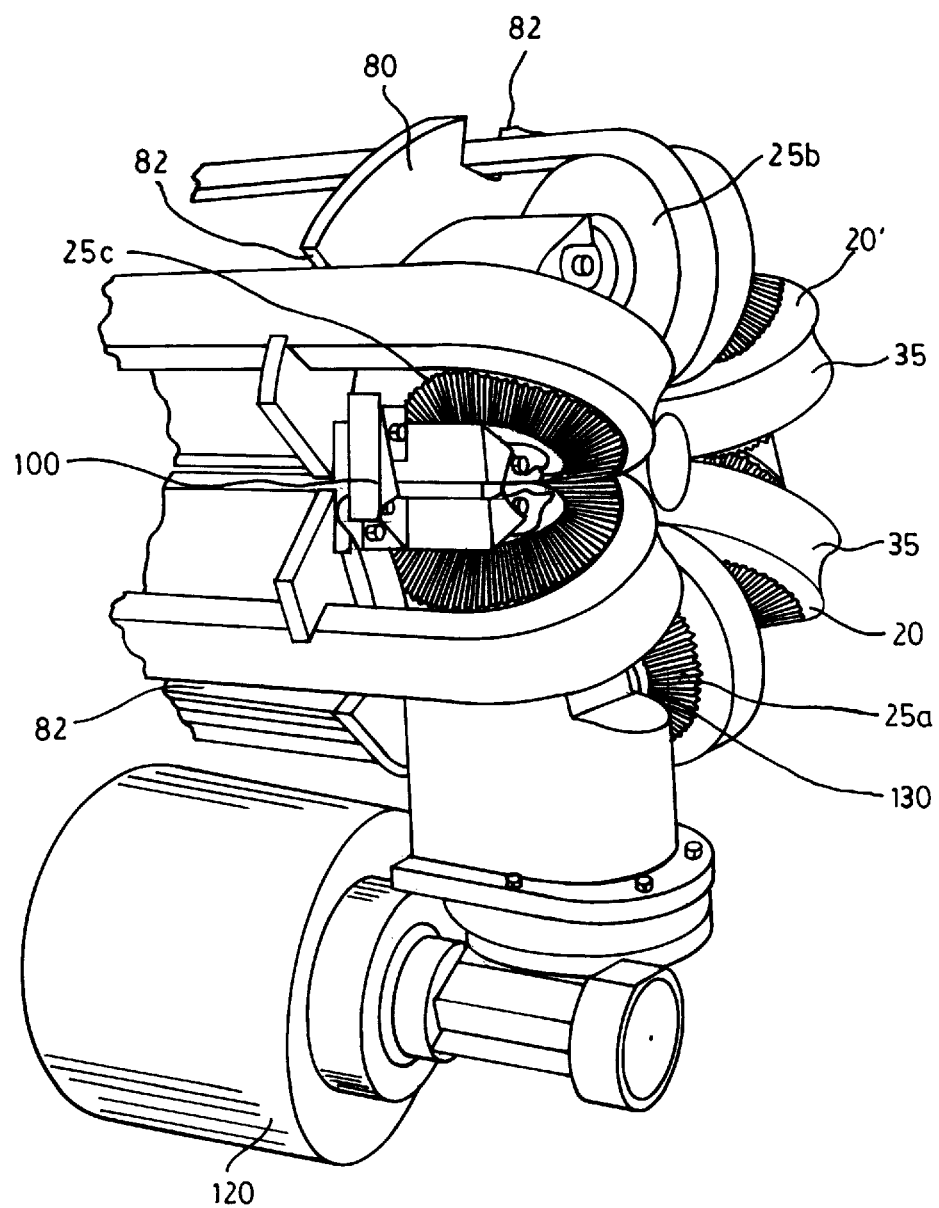
FIG. 4 is perspective view of the post-forming end, Z, of the dough forming apparatus of FIG. 1.
Figure 5:
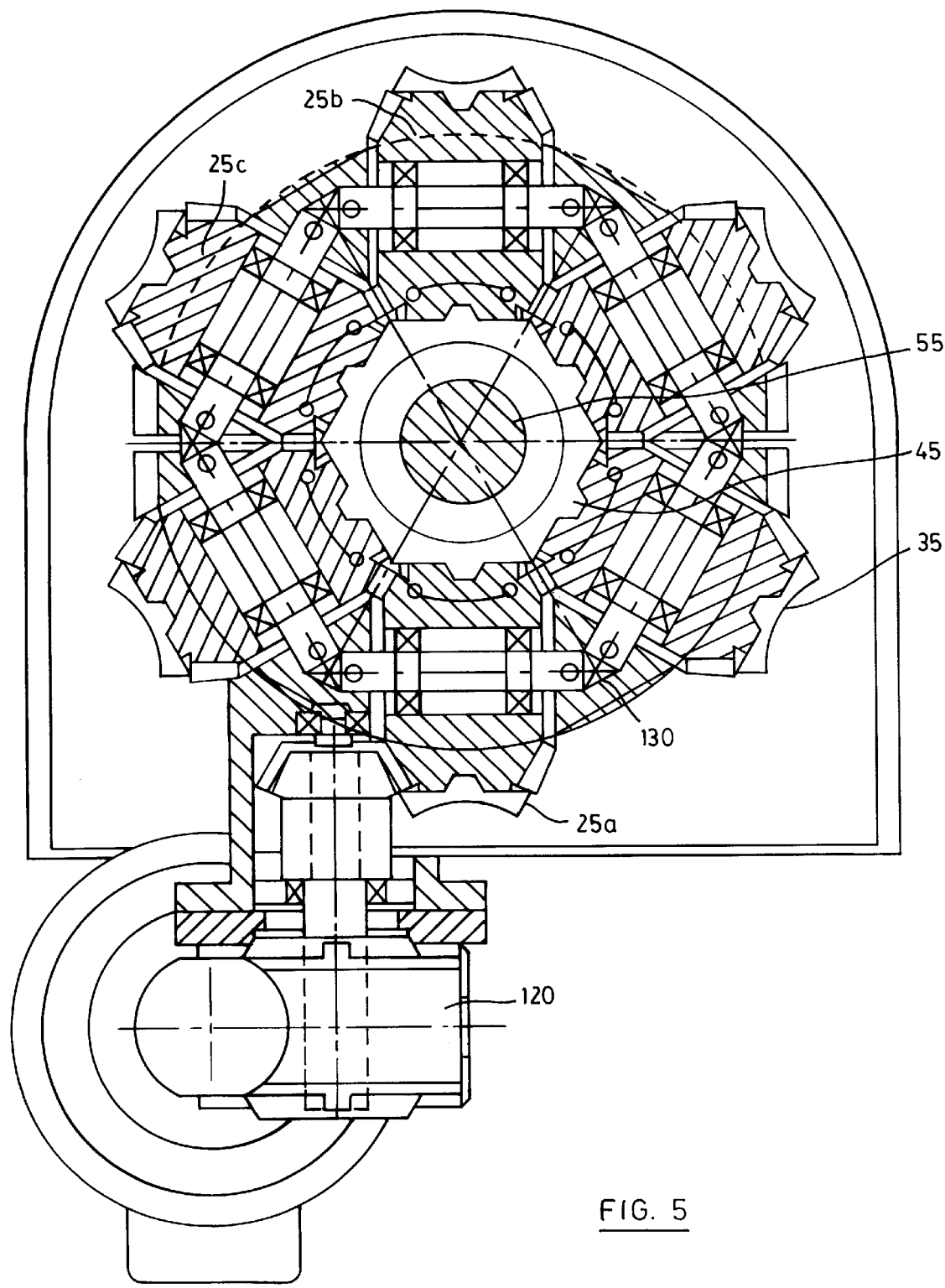
FIG. 5 is a cross-sectional view of the post-forming end, Z, taken along line 5—5 of the dough forming apparatus as shown in FIG. 2.

A dough forming apparatus in accordance with one embodiment of the present invention is shown generally at 10 in FIG. 1. Dough forming apparatus 10 comprises a lower frame 15 which supports a plurality of lower forming belts 20 and upper forming belts 20'. Lower forming belts 20 are longer in length than upper forming belts 20', but the operation of both forming belts 20 and 20' is similar, as will be described in more detail below. As shown in FIG. 2, each belt 20 and 20' is a closed-loop conveyor-type belt which passes around a drive gear 25 and a belt tail pulley 30. As shown in FIGS. 3 and 4, each of belts 20 and 20' have an inverted acuate surface 35. Each of belts 20 and 20' are located in close relationship (substantial abutment) to one-another such that arcuate surfaces 35 of belts 20 and 20' together form the outer surface 40 of a substantially cylindrical passageway 45, as most clearly seen in FIG. 5.

As shown in FIGS. 1 and 2, apparatus 10 further comprises a mandrel 50. Mandrel 50 comprises an elongate forming portion 55 and an adjustment portion 60. Forming portion 55 lies within passageway 45 and adjustment portion 60 is exterior of passageway 45. The purpose and mode of action of adjustment portion 60 of mandrel 50 will be described in more detail below. Elongate forming portion 55 of mandrel 50 is substantially cylindrical and lies substantially coaxial with passageway 45. The outside diameter of forming portion 55 of mandrel 50 is less than the inside diameter of passageway 45. Preferably, forming portion 55 is provided with a plurality of substantially semi-circular raised ribs, shown at 65 in FIG. 3. Ribs 65 lie substantially perpendicular to the longitudinal axis of forming portion 55, along a first side thereof, toward adjustment portion 60. Forming portion 55 further comprises a section of irregularly reduced diameter 70, approximately centrally located along the length of forming portion 55, and at least one additional substantially semi-circular raised rib, shown at 75 in FIG. 3. Rib 75 is situated substantially perpendicular to the longitudinal axis of forming portion 55, on the opposite side thereof from ribs 65. Rib 75 is located distal adjustment portion 60, on the opposite side of the section of irregularly reduced diameter 70 than ribs 65 (i.e., downstream from ribs 65 and section of irregularly reduced diameter 70). The purpose of ribs 65 and 75 and portion of irregularly reduced diameter 70 will be described below when discussing the use of apparatus 10.

In the illustrated embodiment, apparatus 10 comprises six individual forming belts of which three are the long length lower forming belts designated 20 and three are the shorter length upper forming belts designated 20'. As shown in FIGS. 3 and 4, the three belts 20' are supported in close proximity to one another by upper support frame 80 such that arcuate surfaces 35 of belts 20' form a semi-cylindrical trough.

Upper support frame 80 is attached to lower frame 15 by hinges 90 (or other such moveable attachment means). As shown in FIG. 3, hinges 90 allow upper belts 20' to be moved away from lower belts 20 to an open position to permit a user access to passageway 45 and forming portion 55 of mandrel 50 for servicing and ease of belt removal. In general, it is contemplated that belts 20' on support frame 80 will be maintained in a closed position with respect to belts 20, i.e., the position shown in FIGS. 1, 2, 4 and 5. Belts 20' may be maintained in a closed position by a locking means such as draw latches 100. Upper support frame 80 comprises a plurality of recesses 82 (shown most clearly in FIG. 4). These recesses act as belt guides/scrapers to aid in maintaining alignment of the belt and remove excess dough which may become attached to the edges of belts 20 and 20' during use of the apparatus.

Lower frame 15 further supports a motor 120 which provides motive force to at least one of drive gears 25 (designated 25a). Each of drive gears 25 has intermeshing teeth on both sides thereof so that the rotational force produced by motor 120 may be transmitted from drive gear 25a to all the other five drive gears. Each drive gear 25 acts as a pulley and drives the belt (20 or 20', as appropriate) wrapped between it and its corresponding tail pulley 30. When utilizing six forming belts as in the presently preferred embodiment, each drive gear is positioned at approximately 60 degrees to one-another. This hexagonal arrangement of drive gears is shown most clearly in FIGS. 4 and 5. It is apparent from these FIGS. that the arc profile of arcuate surfaces 35 of belts 20 and 20' are formed such that when drive gears 25 are in their hexagonal relationship, belts 20 and 20' together form substantially cylindrical passageway 45.

The choice and operation of the motor (or other drive means) and drive gears is within the purview of a person skilled in the art.

In the presently preferred embodiment, drive is transmitted from drive gear 25a to the drive gears adjacent either side thereof. This allows load to be divided equally between either side of the hexagon formed by the drive gears. Two gears approximately opposite drive gear 25a (designated 25b and 25c) have no teeth on their adjacent surfaces (as shown in FIGS. 3 and 4) in order to substantially eliminate any possible interference between the drive gears when motor 120 is activated and drive gears 25 rotate.

Each of tail pulleys 30 comprises a belt tensioning feature. In the preferred embodiment, tail pulley 30 comprises a pulley around which one of belts 20 or 20' pass. Pulleys for belts 20 are attached to lower frame 15 and pulleys for belts 20' are attached to upper support frame 80. The belt tensioning feature is not shown, for the clarity, but will now be described. Each pulley is moveably attached to the appropriate section of frame by means of a tensioning shaft which provides the axis of rotation for the pulley. Each pulley is provided with a pair of bearings allowing the pulley to rotate freely around the stationary tensioning shaft. Both ends of each tensioning shaft are moveably located in a pair of opposed parallel grooves in the appropriate frame section and each tensioning shaft has a pair of parallel tapped holes therethough for receive tensioning screws. The tensioning screws pass through the tapped holes in the tensioning shaft and abut a portion of the frame perpendicular to the longitudinal axis of the screws. As the tensioning screws are turned, the tensioning shaft and hence the pulley mounted thereon moves toward or away from the perpendicular portion of the frame, i.e., along the longitudinal axis of the belt wrapped around each pulley. As will be apparent to a person of skill in the art, such longitudinal movement of the pulley will increase or decrease the path length of the belt, thereby altering the tension of the belt.

Figure 6:
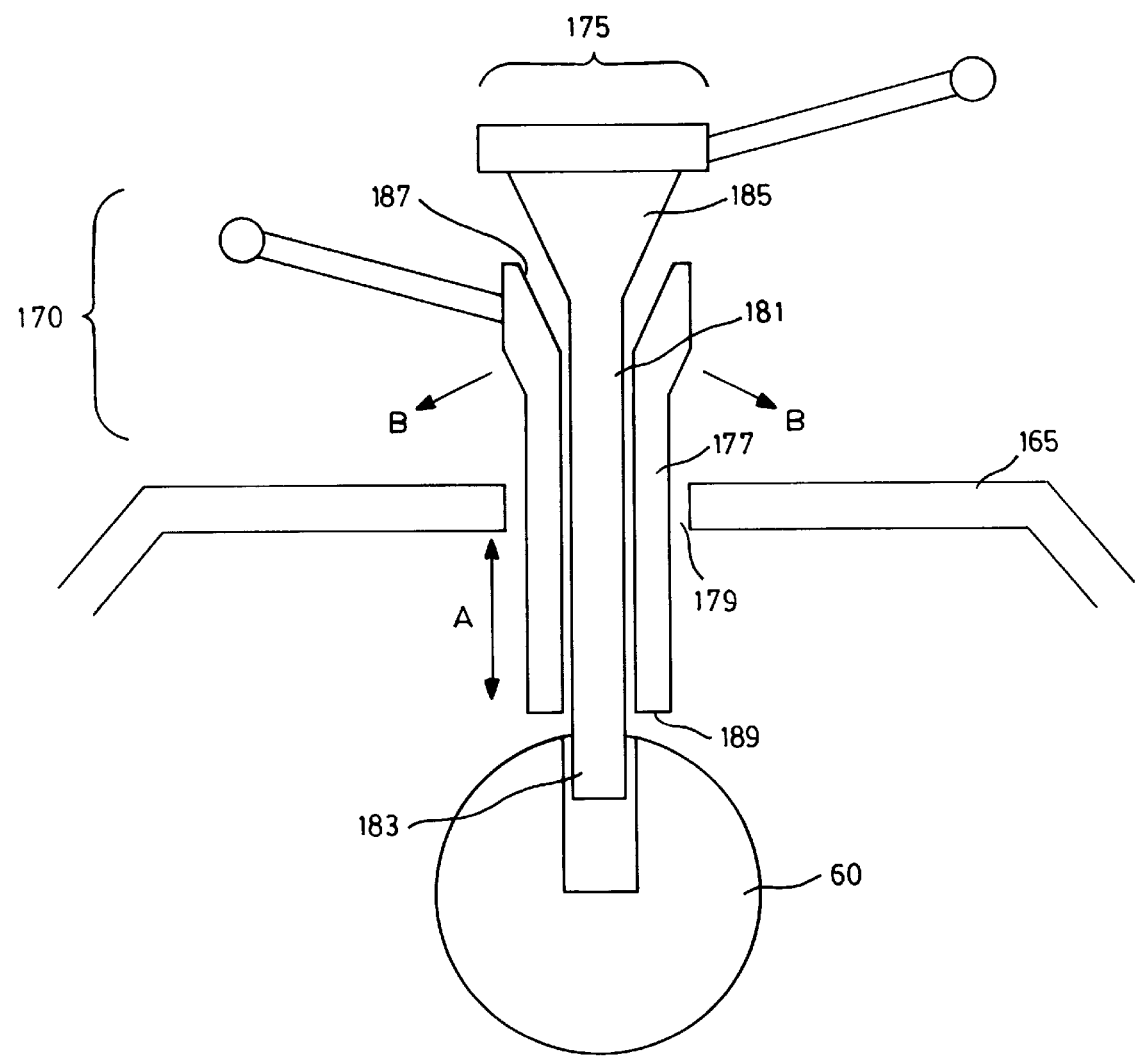
FIG. 6 is a schematic representation of the mandrel adjustment means of the dough forming apparatus of FIG. 1.

As stated above, mandrel 50 comprises adjustment portion 60. Adjustment portion 60 provides a means to alter the position of forming, portion 55 within passageway 45. Adjustment portion 60 comprises a pair of adjustment systems 160 mounted through a pair of support arches 165. Support arches 165 are attached to lower frame 15 and extend from one side thereof to the other side thereof, traversing lower forming belts 20 substantially perpendicular to the longitudinal axis of the belts. Each adjustment system 160 comprise a height adjustment handle 170 and a locking handle 175. The adjustment systems are most clearly shown in FIG. 6. Height adjustment handle 170 comprises a generally cylindrical body 177 having an external thread complementary to a thread in a tapped hole 179 through arch 165. Rotation of adjustment means 170 raises and lowers cylindrical body 177 with respect to arch 165 (Arrow A). Cylindrical body 177 of adjustment handle 170 is hollow and surrounds an elongate shaft 181 of locking handle 175. Lower end 183 of the elongate shaft 181 is threaded and screws into adjustment portion 60 of mandrel 50. Upper end 185 of elongate shaft 181 is tapered and may be received into a frustoconical recess 187 in the top of cylindrical body 177. As locking handle 175 is rotated, lower end 183 engages adjustment portion 60 of mandrel 50 and raises it until it abuts lower edge 189 of cylindrical body 177. At the same time, upper end 185 is drawn into recess 187. Upon continued rotation of locking handle 175, an outward pressure (indicated by Arrows B) is exerted upon cylindrical body 177, forcibly locking cylindrical body 177 within tapped hole 179. Accordingly, adjustment portion 60 of mandrel 50 is locked firmly in place. Cylindrical body 177 may be provided with at least one longitudinal cut along its length (not shown) which facilitates locking of cylindrical body 177 within tapped hole 179 by facilitating the spreading of cylindrical body 177 when the outward pressure is exerted by upper end 185 of locking handle 175.

Mandrel 50 is generally adjusted such that forming portion 55 is substantially coaxial with cylindrical passageway 45. The substantially coaxial alignment helps facilitate even rolling of the dough and hence, the formation of substantially symmetrical toroids.

Preferably mandrel 50 is provided with a pre-pressing plate 200 which is pivotally attached to mandrel 50 proximal a first end of passageway 45. Pre-pressing plate 200 is moveable between a raised position (as shown in solid line in FIG. 2) and a lowered position (200' as shown in dashed line in FIG. 2). Movement of prepressing plate 200 is achieved by means of screw mechanism 210. Rotation of screw mechanism 210 raises and lowers pre-pressing plate 200 with respect to adjustment portion 60 of mandrel 50. Pre-pressing plate 200 acts as an adjustable extension to forming portion 55 of mandrel 50. As such, pre-pressing plate 200 acts as a control mechanism to determine the first point of contact of a dough piece with the forming portion of the mandrel. The purpose of this control will be described below when discussing the operation of apparatus 10.

Belts 20 and 20' are generally composite in construction, comprising a top cover and a bottom reinforcement. The top cover is preferably formed from a white, flexible, food-use approved PVC. As discussed above, the profile of the top cover is arcuate, each belt forming a 60 degree arc of a circle. The radius of the arc is dependent on the size of toroid the users wishes to produce. Preferably, the radius of the arc will be between about 1.25" and about 1.7". The bottom of the belt is generally flat, with a trapezoidal protrusion from the centre. This protrusion is shaped to duplicate a "V" belt. Complementary "V" grooves are machined in drive gears 25 and belt tail pulleys 30. The reinforcing component of the belt is preferably formed from conventional two-ply conveyor belt with PVC coating on one side and treated cotton on the other. The treated cotton serves to reduce friction between the belt and the belt slides on the support frames.

The drive gears are preferably made in two sets. One set is formed from "super-impacto" steel, the second set from Nylatron GSM™. When installed, steel gears alternate with Nylatron™ gears. This alternating combination aids in reducing noise, wear and lubrication requirements. The centre gear and drive pinion of the motor are also preferably formed from "super-impacto" steel, the centre gear and drive pinion being heat treated to improve hardness and coated with a baked dry powder lubricant.

In a preferred embodiment, lower frame 15 and support frame 80 are provided with belt slides (not shown). These belt slides run between each drive gear 25 and its respective belt tail pulley 30. The belt slides receive the trapezoidal protrusion on the bottom of each belt and aid in maintaining linear movement of the belts over their entire length. Belt slides are preferably made from or coated with a low-friction material such as Ultra High Molecular Weight Polyethylene (UHMW).

The operation of the dough forming apparatus will now be described with reference to a scaled piece of dough, i.e., one that is of the correct size and weight to produce a toroid of the desired dimensions.

A scaled piece of dough (such as a ball or a strip) is first placed on lower belts 20 at open end X of apparatus 10. Belts 20 are simultaneously moved such that the piece of dough is conveyed toward the opening Y of cylindrical passageway 45 formed by belts 20 and 20' in combination. As the piece of dough approaches opening Y it contacts pre-forming plate 200. Pre-forming plate 200 imparts a downward pressure on the dough and the difference in velocity between the moving belts 20 and the stationary pressing plate 200 generates a rolling action on the dough. As the dough enters passageway 45 and passes along the length of forming portion 55 of mandrel 50, the rolling dough begins to take on the shape of the cylindrical passageway. Ribs 65 impede the progress of one end of the now generally U-shaped dough as it passes though the passageway, such that the dough forms a serpentine. The formation of the serpentine allows both ends of the dough to extend over the uppermost portion of the mandrel as the dough passes further along the length of the passageway. After the dough has passed the area of the mandrel having an irregularly reduced diameter (70), movement of the now-leading edge of the serpentine is impeded by rib 75. The area of irregularly reduced diameter 70 permits the dough to increase its speed of travel through the passageway to that of the belts as the speed of the dough is not being reduced by contact with the mandrel, thus, further aiding the trailing edge of the dough to catch up with and merge into the leading edge. Thus, impediment of the leading edge of the dough allows the trailing edge of the dough to catch up with and merge into the leading edge, such that the dough forms a toroid. The now-formed toroid of dough passes along the remaining length of passageway 45 until it exits closed end Z of the apparatus.

The size and shape of the scaled piece of dough introduced to the apparatus is not particularly limited and will depend on the nature of the product to be formed. For example, to form a toroid of dough suitable as a bagel, a generally spherical piece of dough weighing between about 50 and 200 grams may be used. The dough may be manufactured using standard baking methods. The selection of a suitable piece of dough is within the purview of a person of skill in the art.

As will be apparent to a person of skill in the art, the length of travel of a piece of dough along the mandrel required to form a complete toroid will to some extent depend on the physical characteristics of the dough, such as size and consistency. The consistency will, for example, determine the stretching characteristics of the dough. The adjustable pre-pressing plate described above aids in compensating for the variable physical characteristics of the dough by allowing the user to alter the position of the first contact point of the dough with the stationary mandrel. Thus, it is possible to increase or reduce the apparent length of the mandrel and accordingly alter the length of travel of the dough along the mandrel. In general, it is envisioned that the mandrel itself will be about 24–26 inches in length.

While the present invention has been described with reference to six belts having arcuate surfaces, it is contemplated that, for example, flat belts may be utilized, resulting in an annular passageway having a substantially hexagonal cross-section. Other cross-sectional shapes are also possible for the annular passageway.

It is envisioned that an apparatus in accordance with the present invention will be utilized as part of a complete production unit. For example, one or more dough forming apparatus may receive scaled pieces of dough from a dough scaling machine/rotary knife divider such as a Model BD-10000 manufactured by ABI Auto Bake Industries Ltd., Woodbridge, Ontario, Canada. Once formed by the one or more dough forming apparatus, the toroids may be transferred to a conveyor system for transportation to a boiling/baking machine for further processing. Preferably, the conveyor system is an indexed board conveyor which permits a plurality of dough toroids to be arranged systematically on individual baking boards. Such a conveyor system allows for easy handling of the large number of dough toroids the forming apparatus is capable of producing per hour.

A production unit as described above, having a single rotary knife divider feeding scaled dough to two dough forming machines simultaneously, has been shown to produce up to 8,600 bagels per hour with a two man operating crew. One operator feeds batches of dough to the rotary knife divider, the second removes the individual baking boards from the conveyor once each board has received its complement of formed bagels.

Although the present invention has been described with respect to an apparatus comprising six belts, the number of belts is not particularly limited. Thus, it is contemplated that an apparatus in accordance with the present invention may comprise two or more, preferably three or more, belts. As will be apparent to a person of skill in the art, as the number of belts changes, so will the arc profile of the arcuate surface of each belt. Further, the exact diameter of the mandrel and the cylindrical passageway is not particularly limited and may be varied depending upon, for example, the size of the dough toroid desired by the user. However, it will be apparent to a person of skill in the art that the diameter of the mandrel must be sized smaller than the diameter of the passageway such that dough can pass between the arcuate surfaces of the belts and the mandrel.

Furthermore, the present invention has been described with reference to an apparatus oriented such that the forming passageway is substantially horizonal. However, an apparatus in accordance with the present invention may also be oriented such that the forming passageway is at any angle, even substantially vertical. Vertical orientation may be preferred to minimize space requirements and/or facilitate post-forming operations in large throughput manufacturing facilities.

Although this invention has been described with reference to illustrative embodiments, this description is not intended to be construed in a limiting sense. Various modifications to the illustrative embodiment as well as other embodiments of the invention will be apparent to a person skilled in the art upon reference to this description. It is therefore contemplated that the appended claims will cover any such modifications or embodiments.

What is claimed is:

1. A dough forming apparatus comprising a frame having attached thereto:
   a) a plurality of endless longitudinally aligned forming belts adapted to receive and convey a piece of dough, each forming belt having an arcuate forming surface contacting the dough, the plurality of belts configured such that the arcuate forming surfaces of the plurality of belts combine to form a substantially cylindrical passageway;
   b) a mandrel, extending coaxially within the substantially cylindrical passageway; and
   c) a drive means for synchronously moving the plurality of forming belts.

2. The dough forming apparatus defined in claim 1, comprising six belts.

3. The dough forming apparatus defined in claim 1, wherein at least one of the belts is attached to a first portion of the frame, the first portion of the frame being in hinged engagement with a second portion of the frame and moveable from a closed position whereby all the belts form the substantially cylindrical passageway, to an open position allowing access to the passageway.

4. The dough forming apparatus defined in claim 1, wherein each of the plurality of belts extends around a drive gear attached proximal a first end of the frame and a tail pulley attached proximal a second end of the frame.

5. The dough forming apparatus defined in claim 4 wherein each of the tail pulleys is attached to the frame by a tensioning means.

6. The dough forming apparatus defined in claim 1, wherein the mandrel comprises an adjustment means operable to lock the portion of the mandrel extending within the substantially cylindrical passageway in a desired position.

7. The dough forming apparatus defined in claim 1, wherein the mandrel includes a first rib operable to impede movement of a first edge portion of a piece of dough as it passes along the mandrel through the substantially cylindrical passageway.

8. The dough forming apparatus defined in claim 7, wherein the mandrel further comprises a portion of reduced diameter downstream from the first rib.

9. The dough forming apparatus defined in claim 8 wherein the mandrel comprises a second rib, downstream of the portion of reduced diameter, operable to impede movement of a second edge portion of a piece of dough as it passes along the mandrel through the substantially cylindrical passageway.

10. The dough forming apparatus defined in claim 1, wherein the mandrel defines a forming length for the dough, the apparatus further comprising an adjustable prepressing plate attached to the apparatus such that movement of the plate alters the forming length of the mandrel.

11. The dough forming apparatus defined in claim 4, wherein each drive gear has at least one beveled edge provided, with a plurality of teeth, the plurality of drive gears being arranged such that the teeth on one drive gear intermeshes with the teeth of an adjacent drive gear thereby permitting rotational force produced by a motor connected to at least one of the drive gears to be transmitted to all drive gears.

12. The dough forming apparatus defined in claim 11, wherein rotational force produced by a motor connected to a first one of the drive gears is transmitted directly to one adjacent drive gears.

13. The dough forming apparatus defined in claim 12, wherein the circumference of each drive gear is provided with a means for maintaining alignment of the belt extending around it.

14. The dough forming apparatus defined in claim 13, wherein the circumference of each drive gear is provided with a recess to receive a protrusion on a surface of a forming belt opposite the arcuate forming surface.

15. A dough forming apparatus comprising a frame having attached thereto:

a) a plurality of longitudinally aligned endless forming belts to receive and convey a piece of dough, each forming belt having a forming surface for contacting the dough, the plurality of belts configured such that the forming surfaces of the plurality of belts combine to form a cylindrical passageway;

b) a mandrel, extending coaxially within the cylindrical passageway; and c) a drive means operable to provide synchronous movement of the plurality of forming belts, the drive means comprising a plurality of drive gears attached proximal a first end of the frame and a motor connected to at least one of the drive gears, wherein each of the plurality of drive gears has at least one beveled edge provided with a plurality of teeth, the plurality of drive gears being arranged such that the teeth on one drive gear intermeshes with the teeth of an adjacent drive gear thereby permitting rotational force produced by the motor to be transmitted to all drive gears, wherein each of the plurality of forming belts extends around a drive gear and a tail pulley attached proximal a second end of the frame.

16. The dough forming apparatus defined in claim 15, wherein each of the tail pulleys is attached to the frame by a tensioning means.

17. The dough forming apparatus defined in claim 15, wherein rotational force produced by a motor connected to a first one of the drive gears is transmitted directly to one adjacent drive gears.

18. The dough forming apparatus defined in claim 17, wherein the circumference of each drive gear is provided with a means for maintaining alignment of the belt extending around it.

19. The dough forming apparatus defined in claim 18, wherein the circumference of each drive gear is provided with a recess to receive a protrusion on a surface of the forming belt opposite the forming surface.

* * * * *